United States Patent
Kanazawa et al.

(10) Patent No.: US 12,329,186 B2
(45) Date of Patent: Jun. 17, 2025

(54) CARBONATED BEVERAGE

(71) Applicant: ASAHI SOFT DRINKS CO., LTD., Tokyo (JP)

(72) Inventors: Naruko Kanazawa, Moriya (JP); Hirofumi Kubota, Moriya (JP); Yumeko Hayashi, Moriya (JP)

(73) Assignee: ASAHI SOFT DRINKS CO., LTD., Tokyo (JP)

( * ) Notice: Subject to any disclaimer, the term of this patent is extended or adjusted under 35 U.S.C. 154(b) by 308 days.

(21) Appl. No.: 17/784,538

(22) PCT Filed: Oct. 28, 2020

(86) PCT No.: PCT/JP2020/040358
§ 371 (c)(1),
(2) Date: Jun. 10, 2022

(87) PCT Pub. No.: WO2021/186784
PCT Pub. Date: Sep. 23, 2021

(65) Prior Publication Data
US 2023/0011443 A1    Jan. 12, 2023

(30) Foreign Application Priority Data
Mar. 16, 2020    (JP) .................................. 2020-045416

(51) Int. Cl.
*A23L 2/56* (2006.01)
*A23L 2/54* (2006.01)

(52) U.S. Cl.
CPC .................. *A23L 2/56* (2013.01); *A23L 2/54* (2013.01); *A23V 2002/00* (2013.01)

(58) Field of Classification Search
CPC .......... A23L 2/54; A23L 2/56; A23V 2002/00
USPC .......................................................... 426/538
See application file for complete search history.

(56) References Cited

FOREIGN PATENT DOCUMENTS

| | | |
|---|---|---|
| JP | 2004-168936 A | 6/2004 |
| JP | 2005-15686 A | 1/2005 |
| JP | 2015-097513 A | 5/2015 |

OTHER PUBLICATIONS

Simas et al., "Citrus species essential oils and their components can inhibit or stimulate fungal growth in fruit", Industrial Crops and Products, 98: 108-115 (2017).
International Search Report for PCT/JP2020/040358 (Dec. 22, 2020).

*Primary Examiner* — Subbalakshmi Prakash
(74) *Attorney, Agent, or Firm* — Merchant & Gould P.C.

(57) ABSTRACT

The present invention provides a carbonated beverage containing 0.25 to 2.0 ppm of α-bisabolol, and a carbonated beverage containing 0.5 to 4.0 ppm of sabinene. Further, the present invention also provides a method for improving the carbonation sensation of a carbonated beverage, the method including adding at least one flavoring selected from the group consisting of α-bisabolol and sabinene to the carbonated beverage, and adjusting the α-bisabolol concentration in the beverage to a value within a range from 0.25 to 2.0 ppm, or adjusting the sabinene concentration in the beverage to a value within a range from 0.5 to 4.0 ppm.

4 Claims, No Drawings

CARBONATED BEVERAGE

This application is a National Stage Application under 35 U.S.C. § 371 of International Patent Application No. PCT/JP2020/040358, filed Oct. 28, 2020, which claims benefit of priority to Japanese Patent Application No. 2020-045416, filed Mar. 16, 2020, and which applications are incorporated herein by reference. To the extent appropriate, a claim of priority is made to each of the above disclosed applications.

TECHNICAL FIELD

The present invention relates to a carbonated beverage having improved carbonation sensation and refreshing feeling.

BACKGROUND

Carbonated beverages include beverages prepared by injecting potable water with carbon dioxide under pressure, and beverages obtained by adding sweeteners, acidifiers and/or flavorings and the like to such beverages. Fruit juices and flavoring agents and the like are mainly used for flavorings. Many carbonated beverages have both strong sweetness and acidity, such as lemonade, cola and ginger ale, but recent demands for improved health consciousness and reduced calories have resulted in an increased need for sugar-free carbonated beverages containing no sugars (so-called carbonated water).

For carbonated beverages, the carbonation sensation and refreshing feeling derived from the carbon dioxide gas are important characteristics. Particularly in carbonated beverages having weak sweetness and acidity, beverages having a stronger carbonation stimulus tends to be more desirable. The carbonation sensation can be enhanced by increasing the amount of carbon dioxide gas injected under pressure into the beverage, but increasing the carbon dioxide gas volume increases the likelihood of gushing during container filling or upon container opening.

On the other hand, flavorings are sometimes used not only for imparting the flavor and aroma inherent to the flavoring itself, but also to improve various other characteristics of the beverage. For example, although β-ionone, methyl salicylate, 1-p-menthen-9-ol, 1-p-menthen-9-yl acetate, sabinene and p-cymene themselves do not have the flavor and aroma of mandarin, blending an appropriate amount of these compounds into a food, beverage or cosmetic can increase the fruity sensation (Patent Document 1).

PRIOR ART LITERATURE

Patent Document
Patent Document 1: Japanese Unexamined Patent Application, First Publication No. 2015-97513

SUMMARY OF INVENTION

Problems to be Solved by the Invention

The present invention has the object of providing a carbonated beverage having improved carbonation sensation and refreshing feeling with no increase in the carbon dioxide gas volume.

Means for Solving the Problems

The inventors of the present invention discovered that by including α-bisabolol or sabinene in a carbonated beverage, the carbonation sensation and refreshing feeling could be improved without increasing the carbon dioxide gas volume, enabling them to complete the present invention.

A carbonated beverage according to the present invention, and a method for producing the carbonated beverage, a method for improving the carbonation sensation of a carbonated beverage, a method for improving the refreshing feeling of a carbonated beverage and a carbonation sensation improver of the present invention are described below in [1] to [10]

[1] A carbonated beverage containing 0.25 to 2.0 ppm of α-bisabolol.
[2] The carbonated beverage according to [1], further containing 0.5 to 4.0 ppm of sabinene.
[3] A carbonated beverage containing 0.5 to 4.0 ppm of sabinene.
[4] The carbonated beverage according to any one of [1] to [3], wherein the beverage is a sugar-free beverage.
[5] The carbonated beverage according to any one of [1] to [4], having a citrus fruit flavor and aroma.
[6] The carbonated beverage according to [5], wherein the citrus fruit is lemon.
[7] A method for producing a carbonated beverage, the method including adding at least one flavoring selected from the group consisting of α-bisabolol and sabinene to the carbonated beverage, and adjusting the α-bisabolol concentration in the beverage to a value within a range from 0.25 to 2.0 ppm, or adjusting the sabinene concentration in the beverage to a value within a range from 0.5 to 4.0 ppm.
[8] A method for improving the carbonation sensation of a carbonated beverage, the method including adding at least one flavoring selected from the group consisting of α-bisabolol and sabinene to the carbonated beverage, and adjusting the α-bisabolol concentration in the beverage to a value within a range from 0.25 to 2.0 ppm, or adjusting the sabinene concentration in the beverage to a value within a range from 0.5 to 4.0 ppm.
[9] A method for improving the refreshing feeling of a carbonated beverage, the method including adding at least one flavoring selected from the group consisting of α-bisabolol and sabinene to the carbonated beverage, and adjusting the α-bisabolol concentration in the beverage to a value within a range from 0.25 to 2.0 ppm, or adjusting the sabinene concentration in the beverage to a value within a range from 0.5 to 4.0 ppm.
[10] A carbonation sensation improver, which contains at least one compound selected from the group consisting of α-bisabolol and sabinene as an active ingredient, and is added to a carbonated beverage.

Effects of the Invention

By employing the present invention, a carbonated beverage can be provided which exhibits superior carbonation sensation and refreshing feeling to a carbonated beverage having a similar carbon dioxide gas volume.

EMBODIMENTS FOR CARRYING OUT THE INVENTION

In the present invention and this description, the term "carbonated beverage" means a beverage that contains carbon dioxide gas. The amount of carbon dioxide gas contained in the beverage is indicated by the carbon dioxide gas volume [vol]. The carbon dioxide gas volume [vol] indicates the ratio of the volume of carbon dioxide gas dissolved in the carbonated beverage relative to the volume of the carbonated beverage at 1 atmosphere and 20° C. The carbon dioxide as volume can be measured, for example, using a commercially available measurement apparatus (gas volume analyzer GVA-500A, manufactured by Kyoto Electronics Manufacturing Co., Ltd.). More specifically, the carbon dioxide gas volume can be obtained by adjusting the sample to 20° C., affixing a gas internal pressure meter, opening the valve and conducting a gas extraction (sniff) operation, immediately closing the valve and performing vigorous shaking, and then calculating the gas volume from the value of the pressure once the pressure has stabilized.

There are no particular limitations on the carbon dioxide gas volume of the carbonated beverage according to the present invention, and the volume may be set to a value within the typical range for carbonated beverages. Particularly in those cases where the carbonated beverage according to the present invention is a sugar-free carbonated beverage, the lower limit for the carbon dioxide gas volume is preferably 3.0 vol, at which level improving the carbonation sensation and refreshing feeling by increasing the gas volume is difficult, and is more preferably 4.0 vol. Further, the upper limit for the carbon dioxide gas volume may be set to 5.5 vol.

In the present invention and this description, the "carbonation sensation" of a carbonated beverage means the stimulus felt when the minute bubbles of carbon dioxide gas are produced, grow, and then burst inside the mouth. This carbonation sensation increases in beverages having a higher carbon dioxide gas volume.

In the present invention and this description, the "refreshing feeling" of a carbonated beverage means the lack of a retained aftertaste in the mouth after drinking the beverage. An improvement in the refreshing feeling of a carbonated beverage means a weakening of any aftertaste following drinking the beverage, and an enhanced sensation of freshness.

In the present invention and this description, a "sugar-free beverage" means a beverage that contains essentially no sugars. In the nutritional labeling standards based on the Health Promotion Act, a beverage can be described as sugar-free provided the sugar content per 100 mL of beverage is less than 0.5 g. Similarly, in the present invention and this description, a beverage is referred to as a sugar-free beverage if the sugar content per 100 mL of beverage is less than 0.5 g, and is referred to as a sugar-containing beverage if the sugar content per 100 mL of beverage is 0.5 g or greater. The term "sugars" refers to monosaccharides and disaccharides such as high fructose corn syrup and sucrose.

A feature of the present invention is an improvement in the carbonation sensation and refreshing feeling of a carbonated beverage by adjusting, to an appropriate level, the amount of at least one aroma component selected from the group consisting of α-bisabolol (bisabola-3,7(11)-dien-10-ol) and sabinene (1-isopropyl-4-methylenebicyclo[3.1.0]hexane). Both α-bisabolol and sabinene are aroma components that are incorporated in citruses, but they exhibit little correlation with the intensity of the citrus flavor, and are only contained in very small amounts (for example, 0 to 50 ppb for α-bisabolol, and 0 to 10 ppb for sabinene) in beverages containing citrus fruit juices or citrus-based flavorings (namely, citrus-based beverages). Both α-bisabolol and sabinene exhibit an action that improves the carbonation sensation and refreshing feeling of carbonated beverages, and the inventors of the present invention were the first to discover that these compounds could function as the active ingredients for carbonation sensation improvers that are added to carbonated beverages.

A first aspect of the carbonated beverage according to the present invention is a carbonated beverage containing 0.25 to 2.0 ppm of α-bisabolol. By incorporating 0.25 to 2.0 ppm of α-bisabolol in the carbonated beverage, the carbonation sensation and the refreshing feeling can be improved compared with carbonated beverages having the same carbon dioxide gas volume but containing either no α-bisabolol or a lesser amount of α-bisabolol, meaning a carbonated beverage having superior carbonation sensation and refreshing feeling can be produced. The amount of α-bisabolol in the carbonated beverage is preferably within a range from 0.5 to 2.0 ppm, more preferably from 1.0 to 2.0 ppm, and even more preferably from 1.5 to 2.0 ppm. Moreover, the range from 0.25 to 2.0 ppm represents the concentration range at which the aroma of the α-bisabolol itself cannot be detected.

A second aspect of the carbonated beverage according to the present invention is a carbonated beverage containing 0.5 to 4.0 ppm of sabinene. By incorporating 0.5 to 4.0 ppm of sabinene in the carbonated beverage, the carbonation sensation and the refreshing feeling can be improved compared with carbonated beverages having the same carbon dioxide gas volume but containing either no sabinene or a lesser amount of sabinene, meaning a carbonated beverage having superior carbonation sensation and refreshing feeling can be produced. The amount of sabinene in the carbonated beverage is preferably within a range from 1.0 to 4.0 ppm, and more preferably from 2.0 to 4.0 ppm. Moreover, the range from 0.5 to 4.0 ppm represents the concentration range at which the aroma of the sabinene itself cannot be detected.

The carbonated beverage according to the present invention may also contain both α-bisabolol and sabinene. By combining α-bisabolol and sabinene, an even greater improvement in the carbonation sensation and refreshing feeling can be obtained. In those cases where the two compounds are combined, there are no particular limitations on the ratio between the compounds. For example, by incorporating both compounds in a ratio within a range from α-bisabolol:sabinene=1:1 to 1:4, excellent improvement in the carbonation sensation and refreshing feeling can be achieved.

In the present invention, the α-bisabolol added to the carbonated beverage may be a chemically synthesized compound, or may be a product extracted from a natural source and purified. Further, a flavoring containing α-bisabolol may also be used as a raw material. Similarly, the sabinene added to the carbonated beverage may be a chemically synthesized compound, or may be a product extracted from a natural source and purified. Furthermore, a flavoring containing sabinene may also be used as a raw material.

The compounds α-bisabolol and sabinene are not contained in large amounts in the various natural substances and flavorings generally used as raw materials in beverages. Accordingly, the amounts of α-bisabolol and sabinene in a carbonated beverage can be calculated from the amounts of α-bisabolol and sabinene added as raw materials. In addition, the α-bisabolol and sabinene in a carbonated beverage can also be measured, for example, by the dichloromethane extraction method or the like, using a gas chromatograph mass spectrometer (GC/MS). Quantitative amounts can be calculated, for example, by an internal standard method using heptan-3-ol, based on the correlation between the peak surface area ratio and the concentration ratio between the target component and the internal standard substance.

The carbonated beverage for which the carbonation sensation and refreshing feeling are improved by incorporating α-bisabolol or sabinene may be either a sugar-free beverage or a sugar-containing beverage. Sugar-free beverages are carbonated beverages containing essentially no sugars (in other words, carbonated beverages in which the sugar content is less than 0.5 g per 100 mL), and are also commonly referred to as carbonated water. Preferred sugar-free carbonated beverages have a sugar content of 0.0 g per 100 mL of beverage. The carbonated beverage according to the present invention is preferably a sugar-free carbonated beverage, as these beverages exhibit a greater improvement in the carbonation sensation and refreshing feeling as a result of the $\alpha$-bisabolol or sabinene, is more preferably a sugar-free carbonated beverage containing no sweeteners other than sugars, including high-sweetness sweeteners such as aspartame, and is even more preferably a sugar-free carbonated beverage containing no sweetener of any kind, including sugars.

Examples of sweeteners that are included in carbonated beverages include high fructose corn syrup, sugar (including sucrose and granular sugar), fructose, high fructose syrup, glucose, oligosaccharides, lactose, honey, starch syrup (maltose), sugar alcohols, and high-sweetness sweeteners. Examples of the sugar alcohols include reduced starch syrup (reduced starch hydrolysate), erythritol, trehalose, sorbitol, xylitol, maltitol, isomalt, mannitol, lactitol, reduced palatinose, and glycerol. Examples of high-sweetness sweeteners include aspartame, acesulfame potassium, disodium glycyrrhizinate, saccharin, saccharin calcium, saccharin sodium, sucralose, neotame, arabinose, glycyrrhiza extract, xylose, stevia, thaumatin, *Momordica grosvenori* extract, rhamnose, and ribose. In those cases where the carbonated beverage according to the present invention is a sugar-containing beverage, a single sweetener may be used alone, or two or more sweeteners may be used.

The carbonated beverage for which the carbonation sensation and refreshing feeling are improved by incorporating $\alpha$-bisabolol or sabinene may be either a carbonated beverage having flavor (a flavored carbonated beverage), or a carbonated beverage having no flavor (an unflavored carbonated beverage). Further, the carbonated beverage according to the present invention may be either an alcoholic beverage, or a non-alcoholic beverage or low-alcohol beverage having an alcohol content of less than 1% by volume. Examples of flavored carbonated beverages include carbonated beverages obtained by mixing carbonated water, or injecting carbon dioxide gas under pressure, into refreshing beverages containing fruit or vegetables as a raw material, refreshing beverages containing a flavoring that imparts a fruit-like flavor or the like, popular beverages such as green tea, tea, coffee, cocoa and herb teas, or lactic beverages containing milk or fermented milk as a raw material. Further examples of the carbonated beverage include effervescent alcoholic beverages such as beer, wine and cider.

In the present invention, the carbonated beverage for which the carbonation sensation and refreshing feeling are improved by incorporating $\alpha$-bisabolol or sabinene is preferably a flavored carbonated beverage. Depending on the type of beverage, in some cases the added $\alpha$-bisabolol or the like may improve the carbonation sensation and the like, but cause a deterioration in the inherent flavor of the beverage itself. In flavored carbonated beverages, the effect on the inherent flavor of the beverage caused by the addition of $\alpha$-bisabolol or sabinene is less than that observed in unflavored carbonated beverages, and therefore the flavor of the beverage is less likely to be adversely affected even in those cases where $\alpha$-bisabolol and/or sabinene is included in an amount sufficient to improve the carbonation sensation and refreshing feeling.

Among flavored carbonated beverages, carbonated beverages having a fruit flavor are preferred as the carbonated beverage according to the present invention, as such beverages exhibit good compatibility with the aroma components of $\alpha$-bisabolol and sabinene, and carbonated beverages having a citrus fruit flavor are more preferred. Examples of citrus fruits include lemon, grapefruit, yuzu, lime, shekwasha, orange and mandarin, and lemon is particularly desirable. Examples of non-citrus fruits include apple, peach, grape, melon, strawberry, mango, pineapple, cassis, and banana.

In addition to carbon dioxide gas and $\alpha$-bisabolol and/or sabinene, the carbonated beverage according to the present invention may also contain the types of sweeteners, acidifiers, flavorings, fruits, fruit juices, vegetable juices, antioxidants, minerals such as salts, bittering agents, colorants, nutrition enhancers, pH modifiers, antifoaming agents, and emulsifiers and the like used in typical beverages. Examples of sweeteners that may be used include those mentioned above.

Examples of acidifiers include citric acid, lactic acid, malic acid, tartaric acid, adipic acid, glucono delta lactone, gluconic acid, succinic acid, glacial acetic acid, fumaric acid, phytic acid, phosphoric acid, and salts of these acids. One of these acidifiers may be used alone, or two or more acidifiers may be used.

There are no particular limitations on the fruits and fruit juices, provided they are typically used as beverage raw materials. The fruit or fruit juice is preferably a citrus fruit or the juice thereof, but may also be a non-citrus fruit or juice thereof. Examples of citrus fruits and non-citrus fruits include the same fruits as those mentioned above. One of these fruits or fruit juices may be used alone, or two or more fruits or juices may be used.

There are no particular limitations on the vegetables of the vegetable juices, provided they are typically used as the raw materials for vegetable juices. Specifically, the vegetable juices of vegetables such as tomato, carrot, spinach, cabbage, brussels sprouts, broccoli, cauliflower, celery, lettuce, parsley, cress, kale, soybeans, beet, red capsicum, pumpkin and komatsuna may be used. One of these vegetable juices may be used alone, or two or more vegetable juices may be used.

The flavorings may be natural flavorings or synthetic flavorings. Specific examples include fruit flavorings, vegetable flavorings, milk flavorings, yoghurt flavorings, or mixtures of these flavorings. Examples of the "fruit" in the fruit flavorings or the "fruit" from which the fruit juice is formed include the same fruits as those mentioned above. One of these flavorings may be used alone, or two or more flavorings may be used.

There are no particular limitations on the nutrition enhancers, provided they are components which can be expected to improve some form of physiological function when ingested by animals including humans. Examples of these components include water-soluble dietary fiber, polyphenols, catechins, and microbial biomass and the like. One of these nutrition enhancers may be used alone, or two or more nutrition enhancers may be used.

The term "water-soluble dietary fiber" means carbohydrates which dissolve in water but are either not digested or only sparingly digested by human digestive enzymes. Examples of water-soluble dietary fiber include soybean dietary fiber (soluble soybean polysaccharides), polydextrose, digestion-resistant dextrin, galactomannan, inulin, guar gum hydrolysate, pectin, and gum arabic.

Examples of antifoaming agents include silicone-based antifoaming agents such as dimethylpolysiloxane.

Examples of emulsifiers include polyglycerol fatty acid esters, glycerol fatty acid esters, sucrose fatty acid esters, polypropylene glycol fatty acid esters, sorbitan fatty acid esters, and polysorbates.

In those cases where the carbonated beverage according to the present invention is a packaged beverage, there are no particular limitations on the container that is filled with the carbonated beverage according to the present invention, and specific examples include glass bottles, cans, and flexible containers. Examples of flexible containers include containers produced by molding a flexible resin such as PE (polyethylene), PP (polypropylene), EVOH (ethylene-vinyl alcohol copolymer) or PET (polyethylene terephthalate). The flexible container may be formed from either a single resin layer or a plurality of resin layers.

The carbonated beverage according to the present invention can generally be produced by a method (blending method) that involves mixing the various raw materials. Specifically, the carbonated beverage can be produced, for example, by a blending step of preparing a blended liquid by mixing the various raw materials, and a gas introduction step of adding carbon dioxide gas to the obtained blended liquid.

First, in the blending step, the raw materials are mixed to prepare a blended liquid. In the blending step, all of the raw materials other than the carbon dioxide gas are preferably mixed together to prepare the blended liquid. There are no particular limitations on the order in which the raw materials are mixed. All of the raw materials may be added to the raw material water at the same time, or the raw materials may be added sequentially, with the initially added raw material dissolved before adding the remaining raw materials. Further, for example, solid (such as powdered or granular) raw materials may be mixed with the raw material water, or the solid raw materials may first be dissolved to form aqueous solutions, and these aqueous solutions then mixed with raw material water as required. Moreover, heated raw materials may be added to the raw material water, and the prepared blended liquid may also be heated.

In those cases where insoluble matter forms in the blended liquid prepared in the blending step, a treatment for removing the insoluble matter such as filtration or the like is preferably performed on the blended liquid prior to the gas introduction step. There are no particular limitations on the insoluble matter removal treatment, which can be conducted using methods typically used in the technical field, such as filtration methods and centrifugal separation methods. In the present invention, insoluble matter is preferably removed by a filtration removal method, and is more preferably removed by a filtration method.

Subsequently, in the gas introduction step, carbon dioxide gas is added to the blended liquid obtained in the blending step. This yields a carbonated beverage. The addition of carbon dioxide gas can be conducted using typical methods. For example, the blended liquid obtained in the blending step may be mixed with carbonated water, or carbon dioxide gas may be added directly to and dissolved in the blended liquid obtained in the blending step.

EXAMPLES

The present invention is described below in further detail using a series of examples and reference examples, but the present invention is not limited to the following examples.

<Sensory Evaluations of Carbonated Beverages>

The carbonation sensation, the refreshing feeling, the stimulus intensity, and the deliciousness (overall evaluation) of carbonated beverages were evaluated by 6 to 10 specialist panelists using an 11-step scale (in which 0 points represents the least sensation, and 10 points represents the greatest sensation). A base liquid prior to introduction of carbon dioxide gas (gas volume 0.0), and liquids in which carbon dioxide gas had been introduced under pressure into the base liquid to achieve gas volumes (GV) of 3.5, 4.0 and 4.5 respectively were prepared, and these liquids were used as evaluation standards. Specifically, as shown in Table 1, the evaluation for the base liquid having a carbon dioxide pressure of 0 GV was evaluated as 0 points, the base liquid at 3.5 GV was evaluated as 1 point, the base liquid at 4GV was evaluated as 5 points, and the base liquid at 4.5 GV was evaluated as 10 points, with a higher point value indicating a stronger sensation.

TABLE 1

| Gas volume (GV) | 0.0 | 3.5 | 4.0 | 4.5 |
|---|---|---|---|---|
| Evaluation points | 0 | 1 | 5 | 10 |

Unless specifically stated otherwise, the base liquid used one of the compositions shown below in Table 2.

TABLE 2

|  | Base liquid 1 (sugar-free, no flavor) | Base liquid 2 (sugar free, lemon flavor) | Base liquid 3 (sugar-containing, no flavor) | Base liquid 3 (sugar-containing, lemon flavor) |
|---|---|---|---|---|
| High fructose corn syrup | — | — | 6.8% | 6.8% |
| Anhydrous citric acid | — | — | 0.1% | 0.1% |
| Trisodium citrate | — | — | 0.05% | 0.05% |
| Citral | — | 10 ppm | — | 10 ppm |
| Water | balance | balance | balance | balance |
| Total | 100% | 100% | 100% | 100% |

Example 1

Comprehensive screening of aroma components that exhibited a high correlation with stimulated carbonation sensation lead to the selection of α-bisabolol, sabinene, geranyl acetate, and γ-terpinene. The effects of these compounds on the carbonation sensation, the refreshing feeling, and the stimulus intensity obtained upon addition to the carbonated beverages were investigated.

Specifically, using water to which a lemon flavoring (0.5 g/L) had been added (namely, lemon-flavored water) as the base liquid, a liquid prepared by injecting carbon dioxide gas into this base liquid under pressure to achieve a gas volume of 4.0 GV was used as a control sample. Samples were then prepared by adding α-bisabolol (1.0 ppm), sabinene (2.0 ppm), geranyl acetate (2.0 ppm), and γ-terpinene (1.0 ppm) respectively to this control sample, and each sample was subjected to the sensory evaluations described above. The results are shown in Table 3. The amounts added of these aroma components were set at concentrations that were markedly higher than the concentrations typically included in commercially available beverages, but of a level that had no effect on the inherent flavor and aroma of the control sample.

TABLE 3

| Sample | Control | 1 | 2 | 3 | 4 |
|---|---|---|---|---|---|
| Test compound | — | α-bisabolol | sabinene | geranyl acetate | γ-terpinene |
| Amount added [ppm] | — | 1.0 | 2.0 | 2.0 | 1.0 |
| Gas volume [GV] | 4.0 | 4.0 | 4.0 | 4.0 | 4.0 |
| Deliciousness | 5.0 | 6.0 | 5.5 | 5.2 | 4.6 |
| Refreshing feeling | 5.0 | 6.3 | 6.3 | 5.5 | 4.7 |
| Intensity of carbonation sensation | 5.0 | 6.2 | 6.2 | 5.0 | 5.5 |
| Stimulus intensity | 5.0 | 6.3 | 6.3 | 5.5 | 5.5 |

These results revealed that in the samples containing added α-bisabolol or sabinene, the carbonation sensation, the refreshing feeling and the stimulus intensity all improved. In other words, it was evident that α-bisabolol and sabinene had the effects of improving the carbonation sensation, the refreshing feeling and the stimulus intensity. In contrast, these improvements could not be confirmed in the samples containing geranyl acetate and γ-terpinene.

Example 2

The effects of α-bisabolol and sabinene on sugar-free unflavored carbonated beverages were investigated. Specifically, using the base liquid 1 shown in Table 1 as the base liquid, a liquid prepared by injecting carbon dioxide gas into this base liquid under pressure to achieve a gas volume of 4.0 GV was used as a control sample. Samples were then prepared by adding 0.25 to 2.0 ppm of α-bisabolol or 0.5 to 4.0 ppm of sabinene to this control sample, and each sample was subjected to the sensory evaluations described above. The results are shown in Tables 4 and 5.

TABLE 4

| Sample | Control | 1 | 2 | 3 | 4 | 5 |
|---|---|---|---|---|---|---|
| Amount of added α-bisabolol [ppm] | — | 0.25 | 0.5 | 1.0 | 1.5 | 2.0 |
| Deliciousness | 5.0 | 6.4 | 6.4 | 6.4 | 6.0 | 5.7 |
| Refreshing feeling | 5.0 | 6.4 | 7.4 | 7.4 | 7.1 | 7.4 |
| Intensity of carbonation sensation | 5.0 | 6.4 | 7.1 | 7.6 | 7.9 | 7.9 |
| Stimulus intensity | 5.0 | 6.9 | 7.4 | 7.9 | 8.1 | 8.1 |

TABLE 5

| Sample | Control | 1 | 2 | 3 | 4 | 5 |
|---|---|---|---|---|---|---|
| Amount of added sabinene [ppm] | — | 0.5 | 1.0 | 2.0 | 3.0 | 4.0 |
| Deliciousness | 5.0 | 5.5 | 6.4 | 6.2 | 5.7 | 5.7 |
| Refreshing feeling | 5.0 | 6.0 | 6.7 | 7.1 | 6.9 | 6.4 |
| Intensity of carbonation sensation | 5.0 | 6.2 | 6.9 | 7.4 | 7.1 | 6.7 |
| Stimulus intensity | 5.0 | 6.4 | 6.9 | 7.4 | 7.1 | 6.9 |

In these sugar-free unflavored carbonated beverages, in those samples containing 0.25 to 2.0 ppm of added α-bisabolol and those samples containing 0.5 to 4.0 ppm of added sabinene, the carbonation sensation, the refreshing feeling and the stimulus intensity all improved. Further, the improvement effects in the carbonation sensation and the like due to the α-bisabolol and sabinene were stronger than those observed for the sugar-containing unflavored carbonated beverages described below in Example 4.

Example 3

The effects of α-bisabolol and sabinene on sugar-free lemon-flavored carbonated beverages were investigated. Specifically, using the base liquid 2 shown in Table 1 as the base liquid, a liquid prepared by injecting carbon dioxide gas into this base liquid under pressure to achieve a gas volume of 4.0 GV was used as a control sample. Samples were then prepared by adding 0.25 to 2.0 ppm of α-bisabolol or 0.5 to 4.0 ppm of sabinene to this control sample, and each sample was subjected to the sensory evaluations described above. The results are shown in Tables 6 and 7.

TABLE 6

| Sample | Control | 1 | 2 | 3 | 4 | 5 |
|---|---|---|---|---|---|---|
| Amount of added α-bisabolol [ppm] | — | 0.25 | 0.5 | 1.0 | 1.5 | 2.0 |
| Deliciousness | 5.0 | 6.0 | 6.2 | 6.2 | 6.4 | 6.4 |
| Refreshing feeling | 5.0 | 6.2 | 6.9 | 7.1 | 7.1 | 7.6 |
| Intensity of carbonation sensation | 5.0 | 5.7 | 6.9 | 7.1 | 7.1 | 7.6 |
| Stimulus intensity | 5.0 | 5.7 | 6.9 | 7.4 | 7.1 | 7.9 |

TABLE 7

| Sample | Control | 1 | 2 | 3 | 4 | 5 |
|---|---|---|---|---|---|---|
| Amount of added sabinene [ppm] | — | 0.5 | 1.0 | 2.0 | 3.0 | 4.0 |
| Deliciousness | 5.0 | 5.0 | 5.5 | 5.7 | 5.5 | 5.2 |
| Refreshing feeling | 5.0 | 5.2 | 5.2 | 5.7 | 6.9 | 6.9 |
| Intensity of carbonation sensation | 5.0 | 5.2 | 5.5 | 6.2 | 6.4 | 6.9 |
| Stimulus intensity | 5.0 | 5.2 | 5.7 | 6.7 | 6.9 | 7.1 |

In these sugar-free lemon-flavored carbonated beverages, in those samples containing 0.25 to 2.0 ppm of added α-bisabolol, the carbonation sensation, the refreshing feeling and the stimulus intensity all improved, and particularly superior improvement effects were confirmed in those samples containing 0.5 to 2.0 ppm of added ca-bisabolol. On the other hand, in those samples containing added sabinene, improvement effects in the carbonation sensation, the refreshing feeling and the stimulus intensity were observed when the amount of added sabinene was within a range from 2.0 to 4.0 ppm. Further, the improvement effects in the carbonation sensation and the like due to the α-bisabolol and sabinene were stronger than those observed for the sugar-containing lemon-flavored carbonated beverages described below in Example 5. Further, in each of the samples, no aroma of the α-bisabolol or sabinene itself was detected.

Example 4

The effects of α-bisabolol and sabinene on sugar-containing unflavored carbonated beverages were investigated. Specifically, using the base liquid 3 shown in Table 1 as the base liquid, a liquid prepared by injecting carbon dioxide gas into this base liquid under pressure to achieve a gas volume of 4.0 GV was used as a control sample. Samples were then prepared by adding 0.25 to 2.0 ppm of α-bisabolol or 0.5 to 4.0 ppm of sabinene to this control sample, and each sample was subjected to the sensory evaluations described above. The results are shown in Tables 8 and 9.

TABLE 8

| Sample | Control | 1 | 2 | 3 | 4 | 5 |
|---|---|---|---|---|---|---|
| Amount of added α-bisabolol [ppm] | — | 0.25 | 0.5 | 1.0 | 1.5 | 2.0 |
| Deliciousness | 5.0 | 5.5 | 6.0 | 6.2 | 6.0 | 5.5 |
| Refreshing feeling | 5.0 | 5.5 | 6.2 | 6.2 | 6.2 | 6.4 |
| Intensity of carbonation sensation | 5.0 | 5.7 | 6.2 | 6.2 | 6.4 | 6.4 |
| Stimulus intensity | 5.0 | 5.5 | 6.2 | 6.2 | 6.4 | 6.9 |

TABLE 9

| Sample | Control | 1 | 2 | 3 | 4 | 5 |
|---|---|---|---|---|---|---|
| Amount of added sabinene [ppm] | — | 0.5 | 1.0 | 2.0 | 3.0 | 4.0 |
| Deliciousness | 5.0 | 5.5 | 5.7 | 6.0 | 6.2 | 5.7 |
| Refreshing feeling | 5.0 | 5.5 | 5.7 | 6.7 | 6.4 | 6.4 |
| Intensity of carbonation sensation | 5.0 | 5.7 | 5.7 | 6.7 | 6.7 | 6.4 |
| Stimulus intensity | 5.0 | 5.7 | 6.0 | 6.7 | 7.1 | 6.9 |

In these sugar-containing unflavored carbonated beverages, in those samples containing 0.5 to 2.0 ppm of added α-bisabolol, the carbonation sensation, the refreshing feeling and the stimulus intensity all improved. On the other hand, in those samples containing added sabinene, improvement effects in the carbonation sensation, the refreshing feeling and the stimulus intensity were observed when the amount of added sabinene was within a range from 2.0 to 4.0 ppm. Further, in each of the samples, no aroma of the α-bisabolol or sabinene itself was detected.

Example 5

The effects of α-bisabolol and sabinene on sugar-containing lemon-flavored carbonated beverages were investigated. Specifically, using the base liquid 4 shown in Table 1 as the base liquid, a liquid prepared by injecting carbon dioxide gas into this base liquid under pressure to achieve a gas volume of 4.0 GV was used as a control sample. Samples were then prepared by adding 0.25 to 2.0 ppm of α-bisabolol or 0.5 to 4.0 ppm of sabinene to this control sample, and each sample was subjected to the sensory evaluations described above. The results are shown in Tables 10 and 11.

TABLE 10

| Sample | Control | 1 | 2 | 3 | 4 | 5 |
|---|---|---|---|---|---|---|
| Amount of added α-bisabolol [ppm] | — | 0.25 | 0.5 | 1.0 | 1.5 | 2.0 |
| Deliciousness | 5.0 | 5.2 | 6.0 | 6.0 | 6.0 | 6.0 |
| Refreshing feeling | 5.0 | 5.5 | 6.0 | 6.2 | 6.2 | 6.0 |
| Intensity of carbonation sensation | 5.0 | 5.7 | 6.0 | 6.2 | 6.2 | 6.0 |
| Stimulus intensity | 5.0 | 5.5 | 6.0 | 6.2 | 6.2 | 5.7 |

TABLE 11

| Sample | Control | 1 | 2 | 3 | 4 | 5 |
|---|---|---|---|---|---|---|
| Amount of added sabinene [ppm] | — | 0.5 | 1.0 | 2.0 | 3.0 | 4.0 |
| Deliciousness | 5.0 | 5.5 | 5.5 | 5.7 | 6.0 | 6.0 |
| Refreshing feeling | 5.0 | 5.7 | 5.7 | 6.0 | 6.7 | 6.7 |
| Intensity of carbonation sensation | 5.0 | 5.7 | 5.7 | 6.0 | 6.4 | 6.7 |
| Stimulus intensity | 5.0 | 5.7 | 6.0 | 6.2 | 6.4 | 6.7 |

In these sugar-containing lemon-flavored carbonated beverages, in those samples containing 0.5 to 2.0 ppm of added ax-bisabolol, the carbonation sensation, the refreshing feeling and the stimulus intensity all improved. On the other hand, in those samples containing added sabinene, improvement effects in the carbonation sensation, the refreshing feeling and the stimulus intensity were observed when the amount of added sabinene was within a range from 2.0 to 4.0 ppm. Further, in each of the samples, no aroma of the α-bisabolol or sabinene itself was detected.

Example 6

The effects of α-bisabolol and sabinene on sugar-free unflavored carbonated beverages were investigated. Specifically, using the base liquid 1 shown in Table 1 as the base liquid, a liquid prepared by injecting carbon dioxide gas into this base liquid under pressure to achieve a gas volume of 4.0 GV was used as a control sample. Samples were then prepared by adding 0 to 1.5 ppm of α-bisabolol and 0 to 3.0 ppm of sabinene to this control sample, and each sample was subjected to the sensory evaluations described above. The results are shown in Table 12.

TABLE 12

| Sample | Control | 1 | 2 | 3 | 4 | 5 | 6 | 7 |
|---|---|---|---|---|---|---|---|---|
| Amount of added α-bisabolol [ppm] | — | 1.5 | 1.25 | 1 | 0.75 | 0.5 | 0.25 | 0 |
| Amount of added sabinene [ppm] | — | 0 | 0.5 | 1 | 1.5 | 2 | 2.5 | 3 |
| Deliciousness | 5.0 | 6.0 | 6.4 | 6.7 | 7.2 | 7.5 | 6.4 | 5.7 |
| Refreshing feeling | 5.0 | 7.1 | 6.9 | 6.7 | 7.5 | 7.5 | 6.9 | 6.9 |
| Intensity of carbonation sensation | 5.0 | 7.9 | 7.5 | 8.3 | 8.6 | 8.1 | 7.2 | 7.1 |
| Stimulus intensity | 5.0 | 8.1 | 7.5 | 8.1 | 8.6 | 8.1 | 7.5 | 7.1 |

Based on comparison with the results of Example 2, it was evident that the samples containing a combination of α-bisabolol and sabinene exhibited a superior carbonation sensation and refreshing feeling to samples containing only one of the added compounds, indicating that superior improvement effects could be obtained by using a combination of both compounds. In particular, samples 3 to 5 which contained the two compounds in a ratio within a range from α-bisabolol:sabinene=1:1 to 1:4 exhibited excellent carbonation sensation and refreshing feeling. Further, the improvements observed due to the α-bisabolol and sabinene were stronger than those observed for the sugar-containing unflavored carbonated beverages described below in Example 8. Furthermore, in each of the samples, no aromas inherent to the α-bisabolol and sabinene were detected.

Example 7

The effects of α-bisabolol and sabinene on sugar-free lemon-flavored carbonated beverages were investigated. Specifically, using the base liquid 2 shown in Table 1 as the base liquid, a liquid prepared by injecting carbon dioxide gas into this base liquid under pressure to achieve a gas volume of 4.0 GV was used as a control sample. Samples were then prepared by adding 0 to 1.5 ppm of α-bisabolol and 0 to 3.0 ppm of sabinene to this control sample, and each sample was subjected to the sensory evaluations described above. The results are shown in Table 13.

TABLE 13

| Sample | Control | 1 | 2 | 3 | 4 | 5 | 6 | 7 |
|---|---|---|---|---|---|---|---|---|
| Amount of added α-bisabolol [ppm] | — | 1.5 | 1.25 | 1 | 0.75 | 0.5 | 0.25 | 0 |
| Amount of added sabinene [ppm] | — | 0 | 0.5 | 1 | 1.5 | 2 | 2.5 | 3 |
| Deliciousness | 5.0 | 6.4 | 6.7 | 6.9 | 7.2 | 7.2 | 6.4 | 5.5 |
| Refreshing feeling | 5.0 | 7.1 | 7.2 | 6.9 | 6.9 | 6.9 | 6.4 | 6.9 |
| Intensity of carbonation sensation | 5.0 | 7.1 | 7.2 | 7.5 | 7.8 | 8.1 | 7.2 | 6.4 |
| Stimulus intensity | 5.0 | 7.1 | 7.2 | 7.5 | 7.8 | 7.8 | 6.9 | 6.9 |

Based on comparison with the results of Example 3, it was evident that the samples containing a combination of α-bisabolol and sabinene exhibited a superior carbonation sensation and refreshing feeling to samples containing only one of the added compounds, indicating that superior improvement effects could be obtained by using a combination of both compounds. In particular, samples 3 to 5 exhibited excellent carbonation sensation and refreshing feeling. Further, the improvements observed due to the α-bisabolol and sabinene were stronger than those observed for the sugar-containing lemon-flavored carbonated beverages described below in Example 9. Furthermore, in each of the samples, no aromas inherent to the α-bisabolol and sabinene were detected.

Example 8

The effects of α-bisabolol and sabinene on sugar-containing lemon-flavored carbonated beverages were investigated. Specifically, using the base liquid 3 shown in Table 1 as the base liquid, a liquid prepared by injecting carbon dioxide gas into this base liquid under pressure to achieve a gas volume of 4.0 GV was used as a control sample. Samples were then prepared by adding 0 to 1.5 ppm of α-bisabolol and 0 to 3.0 ppm of sabinene to this control sample, and each sample was subjected to the sensory evaluations described above. The results are shown in Table 14.

TABLE 14

| Sample | Control | 1 | 2 | 3 | 4 | 5 | 6 | 7 |
|---|---|---|---|---|---|---|---|---|
| Amount of added α-bisabolol [ppm] | — | 1.5 | 1.25 | 1 | 0.75 | 0.5 | 0.25 | 0 |
| Amount of added sabinene [ppm] | — | 0 | 0.5 | 1 | 1.5 | 2 | 2.5 | 3 |
| Deliciousness | 5.0 | 6.0 | 6.7 | 6.7 | 7.8 | 6.9 | 6.4 | 6.2 |
| Refreshing feeling | 5.0 | 6.2 | 6.9 | 6.7 | 7.2 | 7.2 | 6.9 | 6.4 |
| Intensity of carbonation sensation | 5.0 | 6.4 | 7.2 | 7.5 | 7.8 | 7.8 | 7.2 | 6.7 |
| Stimulus intensity | 5.0 | 6.4 | 7.2 | 7.5 | 8.1 | 7.8 | 7.2 | 7.1 |

Based on comparison with the results of Example 4, it was evident that the samples containing a combination of α-bisabolol and sabinene exhibited a superior carbonation sensation and refreshing feeling to samples containing only one of the added compounds, indicating that superior improvement effects could be obtained by using a combination of both compounds. In particular, samples 3 to 5 exhibited excellent carbonation sensation and refreshing feeling. Further, in each of the samples, no aromas inherent to the α-bisabolol and sabinene were detected.

Example 9

The effects of α-bisabolol and sabinene on sugar-containing lemon-flavored carbonated beverages were investigated. Specifically, using the base liquid 4 shown in Table 1 as the base liquid, a liquid prepared by injecting carbon dioxide gas into this base liquid under pressure to achieve a gas volume of 4.0 GV was used as a control sample. Samples were then prepared by adding 0 to 1.5 ppm of α-bisabolol and 0 to 3.0 ppm of sabinene to this control sample, and each sample was subjected to the sensory evaluations described above. The results are shown in Table 15.

TABLE 15

| Sample | Control | 1 | 2 | 3 | 4 | 5 | 6 | 7 |
|---|---|---|---|---|---|---|---|---|
| Amount of added α-bisabolol [ppm] | — | 1.5 | 1.25 | 1 | 0.75 | 0.5 | 0.25 | 0 |
| Amount of added sabinene [ppm] | — | 0 | 0.5 | 1 | 1.5 | 2 | 2.5 | 3 |
| Deliciousness | 5.0 | 6.0 | 6.9 | 7.2 | 7.2 | 6.7 | 6.7 | 6.0 |
| Refreshing feeling | 5.0 | 6.2 | 7.2 | 7.2 | 7.2 | 6.7 | 6.7 | 6.7 |
| Intensity of carbonation sensation | 5.0 | 6.2 | 6.9 | 7.5 | 7.5 | 7.2 | 6.9 | 6.4 |
| Stimulus intensity | 5.0 | 6.2 | 6.9 | 7.5 | 7.5 | 6.9 | 6.9 | 6.4 |

Based on comparison with the results of Example 5, it was evident that the samples containing a combination of α-bisabolol and sabinene exhibited a superior carbonation sensation and refreshing feeling to samples containing only one of the added compounds, indicating that superior improvement effects could be obtained by using a combination of both compounds. In particular, samples 3 to 5 exhibited excellent carbonation sensation and refreshing feeling. Further, in each of the samples, no aromas inherent to the α-bisabolol and sabinene were detected.

The invention claimed is:
1. A carbonated beverage containing comprising:
   0.25 to 2.0 ppm of a-bisabolol,
   0.5 to 4.0 ppm of sabinene, and
   3.0 to 5.5 vol of carbon dioxide gas,
   wherein the carbonated beverage has a lemon flavor.
2. The carbonated beverage according to claim 1, wherein the beverage is a sugar-free beverage.

3. A method for producing a carbonated beverage, the method comprising:
- a blending step of adding 0.25 to 2.0 ppm of a-bisabolol and 0.5 to 4.0 ppm of sabinene to a raw material to obtain a blended liquid, and
- a gas introduction step of adding 3.0 to 5.5 vol of carbon dioxide gas to the blended liquid,
- wherein the carbonated beverage has a lemon flavor.

4. A method for improving a carbonation sensation or a refreshing feeling of a carbonated beverage, the method comprising:
- a blending step of blending raw materials to obtain a blended liquid, and
- a gas introduction step of adding 3.0 to 5.5 vol of carbon dioxide gas to the blended liquid,
- wherein 0.25 to 2.0 ppm of a-bisabolol and 0.5 to 4.0 ppm of sabinene are added to the blended liquid to improve a carbonation sensation or a refreshing feeling of the carbonated beverage, and the carbonated beverage has a lemon flavor.

* * * * *